(12) United States Patent
Prischak

(10) Patent No.: US 9,291,290 B2
(45) Date of Patent: Mar. 22, 2016

(54) FOLDABLE HVAC CONDUIT AND DUCT COLLAR

(71) Applicant: Joseph J. Prischak, Erie, PA (US)

(72) Inventor: Joseph J. Prischak, Erie, PA (US)

(73) Assignee: Havaco Technologies, Erie, PA (US)

(*) Notice: Subject to any disclaimer, the term of this patent is extended or adjusted under 35 U.S.C. 154(b) by 387 days.

(21) Appl. No.: 13/898,987

(22) Filed: May 21, 2013

(65) Prior Publication Data

US 2013/0306184 A1    Nov. 21, 2013

Related U.S. Application Data

(60) Provisional application No. 61/649,696, filed on May 21, 2012.

(51) Int. Cl.
| | |
|---|---|
| F16L 9/00 | (2006.01) |
| F16L 11/12 | (2006.01) |
| F16L 21/06 | (2006.01) |
| F16L 9/17 | (2006.01) |
| F16L 9/22 | (2006.01) |
| F24F 13/00 | (2006.01) |

(52) U.S. Cl.
CPC ............... *F16L 11/12* (2013.01); *F16L 9/006* (2013.01); *F16L 9/17* (2013.01); *F16L 9/22* (2013.01); *F16L 21/06* (2013.01); *F24F 13/00* (2013.01)

(58) Field of Classification Search
CPC ....... F16L 11/12; F16L 21/06; F24F 13/0209; F24F 13/0227
USPC ............... 138/151, 156, 162–168; 285/373, 285/140.1, 210
See application file for complete search history.

(56) References Cited

U.S. PATENT DOCUMENTS

| | | | | |
|---|---|---|---|---|
| 680,595 | A | * | 8/1901 | Inshaw ........................... 228/144 |
| 2,640,717 | A | | 6/1953 | Scheuring ..................... 285/129 |
| 2,717,788 | A | | 9/1955 | Raynes ......................... 285/129 |
| 3,019,036 | A | | 1/1962 | Stanger .......................... 285/18 |
| 3,066,944 | A | | 12/1962 | Amblard et al. ............... 277/156 |
| 3,113,791 | A | | 12/1963 | Frost et al. ..................... 285/112 |
| 3,231,297 | A | | 1/1966 | Watts et al. ...................... 285/24 |
| 3,231,298 | A | | 1/1966 | Tomb et al. ................... 285/233 |
| 3,464,722 | A | | 9/1969 | Larkin .......................... 285/367 |
| 3,578,026 | A | * | 5/1971 | Meyer, Jr. ..................... 138/110 |
| 3,600,770 | A | | 8/1971 | Halling ............................ 24/279 |
| 3,606,404 | A | * | 9/1971 | McGann, Jr. ................. 285/424 |
| 3,635,506 | A | | 1/1972 | Womble et al. ............... 285/411 |
| 3,661,409 | A | | 5/1972 | Brown et al. ................... 285/82 |

(Continued)

FOREIGN PATENT DOCUMENTS

| | | |
|---|---|---|
| DE | 2 263 397 A1 | 6/1974 |
| DE | 44 02 680 A1 | 8/1995 |

(Continued)

*Primary Examiner* — Patrick F Brinson
(74) *Attorney, Agent, or Firm* — Jonathan M. D'Silva; MacDonald, Illig, Jones & Britton LLP

(57) ABSTRACT

What is presented is heating, ventilation, and air conditioning (HVAC) ductwork. The HVAC ductwork comprises a strip of material, which is divided into a plurality of circumferential segments by a plurality of living hinges. The living hinges allow the HVAC ductwork to unfold for transportation and storage purposes. The strip of material has both a first locking mechanism and a second locking mechanism that are adapted to interlock with each other at an interlocking site, to create the assembled HVAC ductwork.

15 Claims, 5 Drawing Sheets

(56) References Cited

U.S. PATENT DOCUMENTS

| | | | | |
|---|---|---|---|---|
| 3,705,737 | A | 12/1972 | Westerlund et al. | 285/365 |
| 3,761,114 | A | 9/1973 | Blakeley | 285/111 |
| 3,803,792 | A * | 4/1974 | Fulton | 52/533 |
| 4,009,895 | A | 3/1977 | Koskolos | 285/189 |
| 4,123,095 | A | 10/1978 | Stehlin | 285/409 |
| 4,191,410 | A | 3/1980 | Voituriez et al. | 285/367 |
| 4,225,160 | A | 9/1980 | Ortloff | 285/137 |
| 4,438,958 | A | 3/1984 | De Cenzo | 285/234 |
| 4,443,031 | A | 4/1984 | Borsh et al. | 285/419 |
| 4,478,381 | A | 10/1984 | Pittion et al. | 248/71 |
| 4,488,744 | A | 12/1984 | Bubeck et al. | 285/408 |
| 4,561,678 | A | 12/1985 | Kunsman | 285/39 |
| 4,568,115 | A | 2/1986 | Zimmerly | 285/411 |
| 4,630,415 | A | 12/1986 | Attwell | 52/221 |
| 4,702,499 | A | 10/1987 | deRaymond et al. | 285/112 |
| 4,720,359 | A * | 1/1988 | Glauz et al. | 261/24 |
| 4,725,463 | A * | 2/1988 | Baumber et al. | 428/33 |
| 4,781,406 | A | 11/1988 | Hübener | 285/408 |
| 4,795,197 | A | 1/1989 | Kaminski et al. | 285/12 |
| 4,830,060 | A * | 5/1989 | Botsolas | 138/149 |
| 4,915,418 | A | 4/1990 | Palatchy | 285/24 |
| 4,966,395 | A | 10/1990 | Hendrickson | 285/12 |
| 5,015,013 | A | 5/1991 | Nadin | 285/64 |
| 5,018,768 | A | 5/1991 | Palatchy | 285/24 |
| 5,158,114 | A * | 10/1992 | Botsolas | 138/149 |
| 5,277,458 | A | 1/1994 | Tschann | 285/411 |
| 5,347,769 | A | 9/1994 | Dinsmore | 52/101 |
| 5,366,263 | A | 11/1994 | Hendrickson | 285/364 |
| 5,380,052 | A | 1/1995 | Hendrickson | 285/364 |
| 5,918,644 | A * | 7/1999 | Haack et al. | 138/151 |
| 6,030,006 | A | 2/2000 | Lin | 285/411 |
| 6,230,750 | B1 * | 5/2001 | Lessard et al. | 138/149 |
| 6,244,633 | B1 | 6/2001 | Warren | 285/424 |
| 6,273,145 | B1 * | 8/2001 | Botting | 138/166 |
| 6,499,773 | B1 | 12/2002 | Östergaard | 285/408 |
| 6,619,164 | B1 | 9/2003 | Ricci et al. | 82/113 |
| 7,124,609 | B1 | 10/2006 | Hermanson | 72/82 |
| 7,534,965 | B1 | 5/2009 | Thompson | 174/153 |
| 2,911,239 | A1 | 11/2013 | Marzoff, Sr. | 285/415 |
| 8,950,439 | B2 * | 2/2015 | Dudley et al. | 138/149 |
| 2003/0062720 | A1 | 4/2003 | Anderson | 285/140.1 |
| 2003/0150114 | A1 | 8/2003 | Reyal | 29/897.3 |
| 2003/0227171 | A1 | 12/2003 | Legeai et al. | 285/373 |
| 2004/0061335 | A1 | 4/2004 | Mills | 285/409 |
| 2005/0121911 | A1 | 6/2005 | Ryhman et al. | 285/363 |
| 2005/0184523 | A1 | 8/2005 | Stravitz | 285/903 |
| 2005/0218648 | A1 | 10/2005 | Logue, Jr. | 285/18 |
| 2006/0049634 | A1 | 3/2006 | Goodsel et al. | 285/406 |
| 2006/0199505 | A1 | 9/2006 | Fettkether | 454/232 |
| 2009/0302601 | A1 | 12/2009 | Sarkisyan et al. | 285/337 |
| 2011/0041432 | A1 | 2/2011 | Colwell | 52/220.8 |
| 2011/0210222 | A1 | 9/2011 | Van Walraven | 248/315 |
| 2011/0266791 | A1 * | 11/2011 | Fetko | 285/148.24 |

FOREIGN PATENT DOCUMENTS

| | | |
|---|---|---|
| DE | 195 47 214 A1 | 2/1997 |
| FR | 1 222 385 | 6/1960 |
| FR | 2 772 107 | 6/1999 |
| GB | 732442 | 6/1955 |
| GB | 1 334 258 | 10/1973 |
| GB | 2 084 235 A | 4/1982 |
| JP | 7318152 A | 12/1995 |
| JP | 10253093 A | 9/1998 |
| JP | 2001-33088 A | 2/2001 |
| JP | 2004-347181 A | 12/2004 |
| WO | WO 98/46926 A1 | 10/1998 |
| WO | WO 2010/134771 A2 | 11/2010 |

* cited by examiner

FOLDABLE HVAC CONDUIT AND DUCT COLLAR

This application takes priority from U.S. provisional application No. 61/649,696 filed May 21, 2012, which is incorporated herein by reference.

BACKGROUND

Heating, ventilation, and air conditioning (HVAC) is a general term encompassing environmental control of a building. HVAC systems typically connect heating and cooling units through a variety of ductwork and accessories such as conduits, duct collars, outlets, vents, etc. Of these types of ductwork, the duct collars and conduits are typically cylindrical in shape and bulky, and take up large volumes of space while still having a relatively light weight. This shape makes the shipping and marketing of these HVAC conduits and duct collars to be more expensive than necessary. Thus, there is a demand for solutions towards reducing the volume of HVAC conduits and duct collars when shipping to reduce overall shipping and marketing costs. What is presented is foldable HVAC ductwork, such as a conduit and duct collar, which decreases shipping costs as well as provides packaging and marketing opportunities for the HVAC industry.

Foldable devices within a variety of fields, similar to HVAC field, have been created in the past. However, these devices are made to solve the problem of connecting and disconnecting two parts of a conduit together. None of these devices unfold out sufficiently to address the problems associated with shipping bulky HVAC conduits and ductwork. Thus, what is presented herein is a non-obvious solution to a long felt problem.

SUMMARY

What is presented is foldable heating, ventilation, and air conditioning (HVAC) ductwork. The HVAC ductwork comprises a strip of material, which is divided into a plurality of circumferential segments by a plurality of living hinges. The living hinges allow the HVAC ductwork to unfold for transportation and storage purposes. The strip of material has both a first locking mechanism and a second locking mechanism located on it. The first locking mechanism and the second locking mechanism are both adapted to interlock with each other at an interlocking site to create assembled HVAC ductwork.

The HVAC ductwork could have a circular cross-section when it is properly assembled. The strip of material could be made from a molded polymer. The HVAC ductwork could have a finishing seal that is applied to the interlocking site, to facilitate an air tight seal in the properly assembled HVAC ductwork.

The HVAC ductwork could have a flange extending from at least one of its circumferential segments so that when assembled the HVAC ductwork forms into an HVAC duct collar. The previously assembled HVAC duct collar could also include a damper that is installed within it.

What is also presented is an HVAC duct collar with a circular cross-section that connects to an HVAC conduit. The HVAC duct collar comprises a polymer molded strip of material, which is divided into a plurality of circumferential segments by a plurality of living hinges, which has a first locking mechanism and a second locking mechanism. The living hinges allow the HVAC duct collar to unfold for transportation and storage purposes. The HVAC duct collar also comprises a flange, which extends laterally from an edge of at least one of the circumferential segments. The first locking mechanism and second locking mechanism are each adapted to interlock with each other at an interlocking site.

The HVAC duct collar could comprise a finishing seal that is applied to the interlocking site, which facilitates an air tight seal in the assembled HVAC duct collar. The HVAC duct collar could also comprise a damper that is installed within it.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
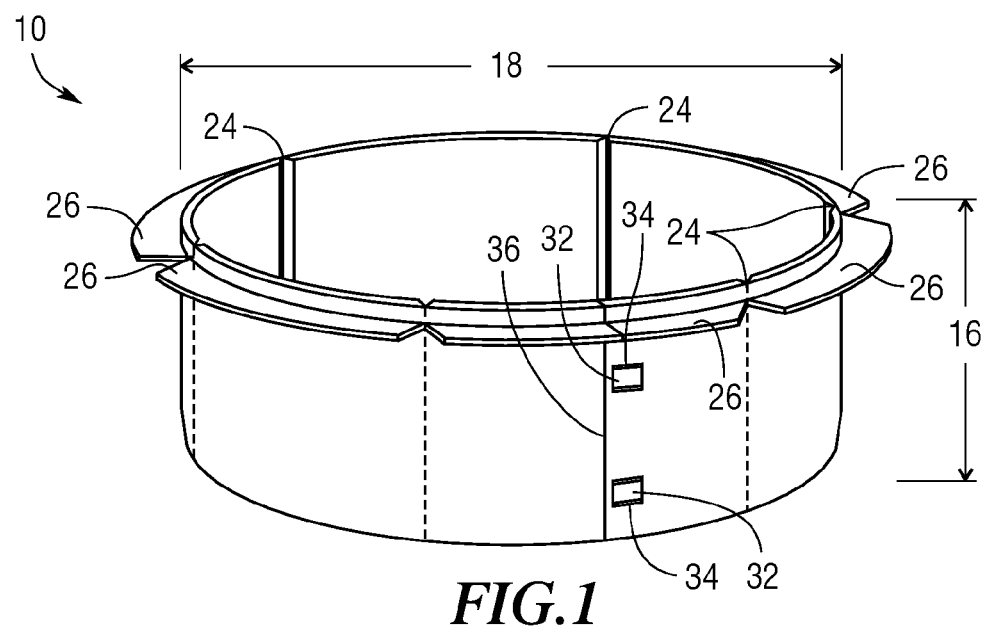
FIG. 1 is a perspective view of the assembled HVAC duct collar.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Figure 2:
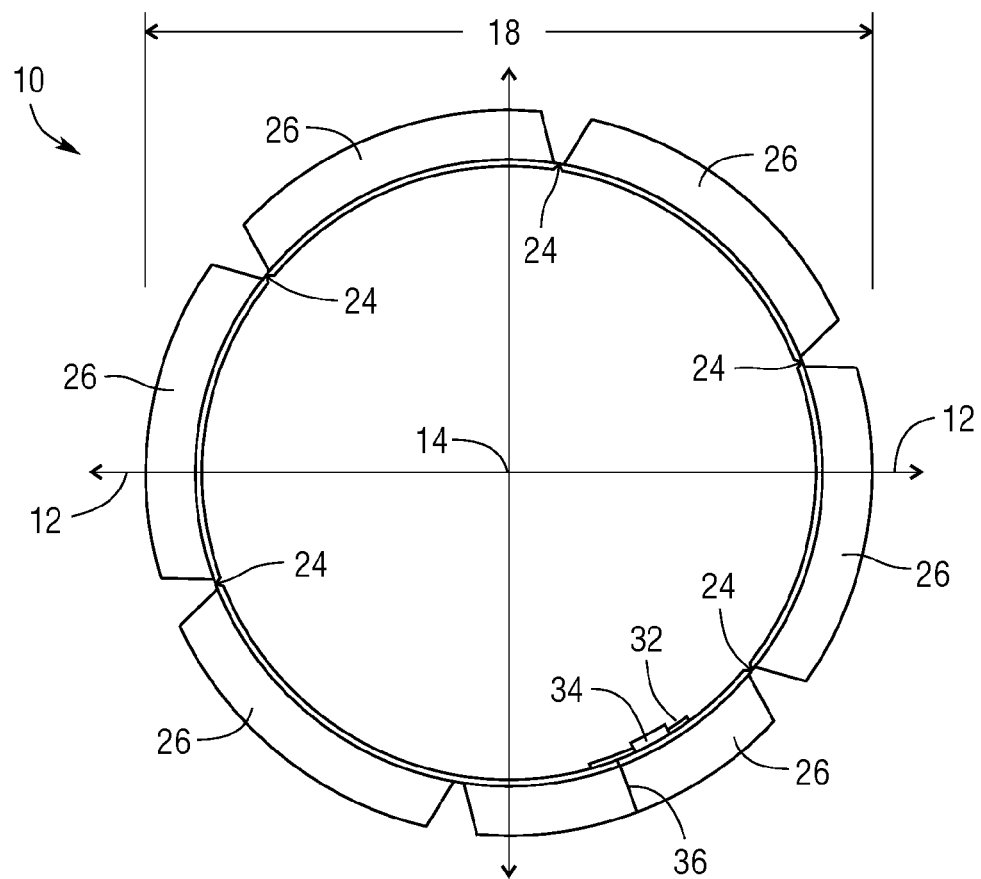
FIG. 2 is a top view of the assembled HVAC duct collar of FIG. 1.
Figure 3:
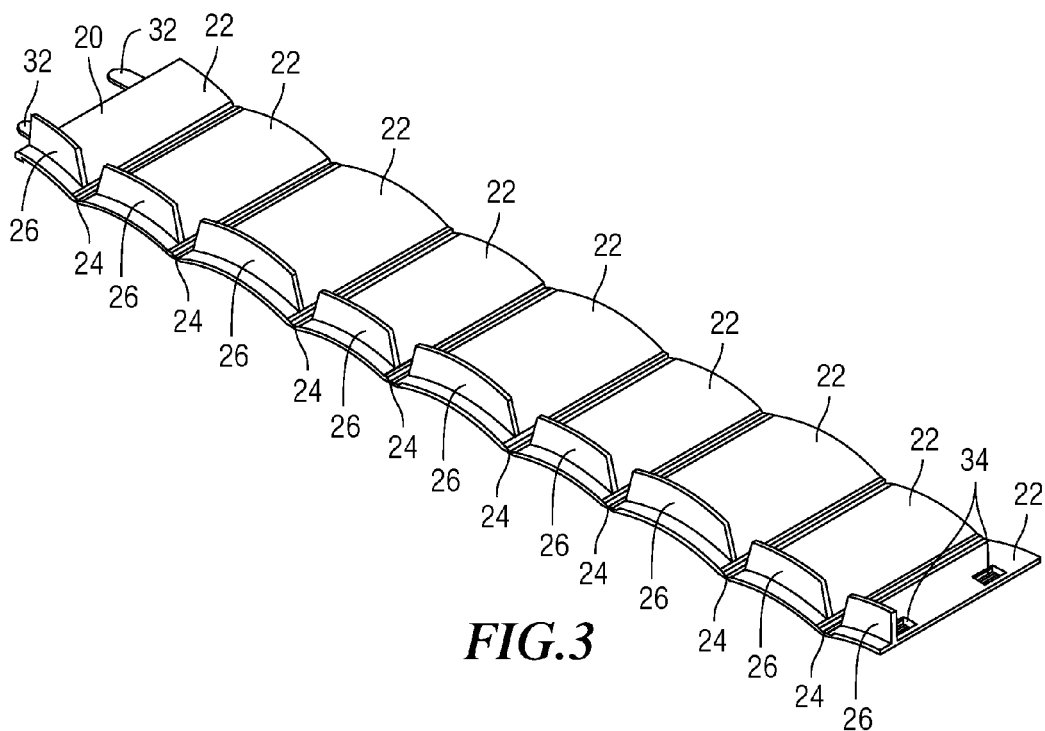
FIG. 3 is a perspective view of the unfolded HVAC duct collar of FIG. 1.
Figure 4:
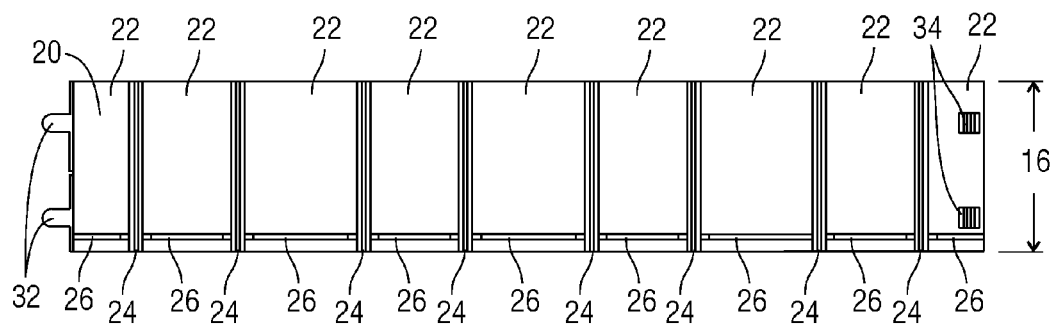
FIG. 4 is a top view of the unfolded HVAC duct collar of FIG. 1.
Figure 5:
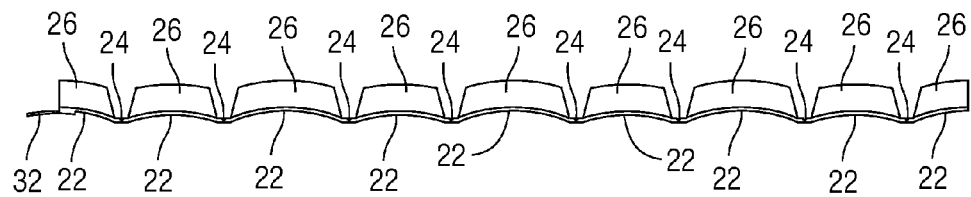
FIG. 5 is a side view of the unfolded HVAC duct collar of FIG. 1.

As shown in FIGS. 1 and 2, an assembled foldable HVAC duct work is an HVAC duct collar 10 that is a tube around the central axis 14 with a circular cross-section 12, a length 16, and a width 18. As best shown in FIGS. 3-5, the unfolded HVAC duct collar 10 is also shaped to allow HVAC ductwork, such as conduits, to connect to it. The HVAC duct collar 10 comprises a polymer molded strip of material 20 that is made through an injection molding machine. The strip of material 20 is divided up into a plurality of circumferential segments 22 having equal lengths by a plurality of living hinges 24. The HVAC duct collar 10 comprises at least two living hinges 24, so there will be a minimum of three circumferential segments 22 on the HVAC duct collar 10. It will be understood that the strip of material 20 may be made from a material other than a molded polymer, such as, but not limited to, an elastomer or metallic material. One having ordinary skill in the art will also see that the assembled foldable HVAC duct collar 10 may have a cross-section that is some shape other than circular, including, but not limited to, octagonal or square.

The living hinges 24 flexibly bend back and forth to allow the HVAC duct collar 10 to unfold out. Each living hinge 24 is a thin hinge (flexure bearing) that allows motion through its bending and is made from the same molded polymer material as the strip of material 20, including the two circumferential segments 22 to which the living hinge 24 creates and connects. To create a living hinge 20 a straight line is cut along the body of the strip of material 20, and the flanges 26 (discussed below), that is just deep enough to allow the circumferential segments 22 on both sides of the living hinge 24 to bend. When each of the living hinges 24 are folded properly, they assemble the entire HVAC duct collar 10 into its circular shape. When unfolded, the living hinges 24 turn the HVAC duct collar 10 into a relatively flat strip with a linear orientation, so that the unfolded HVAC duct collar 10 uses less space and can be stacked with other unfolded HVAC duct collars 10. Since they are simple to make, these living hinges 24 are cost effective to create while manufacturing the respective HVAC duct collar 10.

Each of the circumferential segments 22 is a sectioned-off portion of the strip of material 20 that forms the walls of the HVAC duct collar 10 when assembled. A laterally extending flange 26 also protrudes outward and away from the central axis 14 of the assembled HVAC duct collar 10. The flange 26 allows at least one joining mechanism (not shown) to be inserted through its body so as to ensure the assembled HVAC duct collar 10 will stay in a stationary position when successfully installed into a wall, ceiling, or other surface. Each flange 26 is located at or near (within approximately an inch of) the edge of the circumferential segment 22 that it extends from laterally. Positioning the flange 26 at this location allows for the use of a cover (not shown), or other similar additional element, over the HVAC duct collar 10 in certain instances when the HVAC duct collar 10 and all associated ductwork is installed. One of ordinary skill in the art will see that each flange 26 could be located anywhere along the body of its respective circumferential segment 22 while still adequately performing its function. It will be understood that the flange 26 is an essential element in creating the assembled HVAC duct collar 10. Without a single flange 26, the assembled HVAC duct collar 10 is simply an HVAC conduit.

Referring to FIGS. 1 through 5, a locking mechanism set, having both a first locking mechanism 32 and a second locking mechanism 34, is found at both ends of the length of the strip of material 20. Both the first locking mechanism 32 and second locking mechanism 34 are adapted to interlock with each other to create an interlocking site 36, which is the equivalent of a seam between the interlocked ends of the length of the strip of material 20. In this embodiment the first locking mechanism 32 is a tab and the second locking mechanism 34 is an adapted hole to which the first locking mechanism 32 mates. Typically, the strip of material 20 incorporates two sets of locking mechanisms 32 and 34 to properly assemble and secure the HVAC duct collar into its tube shape, but it should be understood that the strip of material 20 can incorporate more than two sets. One having ordinary skill in the art will also see that a finishing seal (not shown) may also be applied to the interlocking site 36. This finishing seal ensures that the interlocking site 32 is air tight, which may be needed in certain instances after installation. The finishing seal could be an adhesive material fixedly applied over and covering the interlocking site 36, but the finishing seal is not limited solely to this embodiment.

Figure 6:
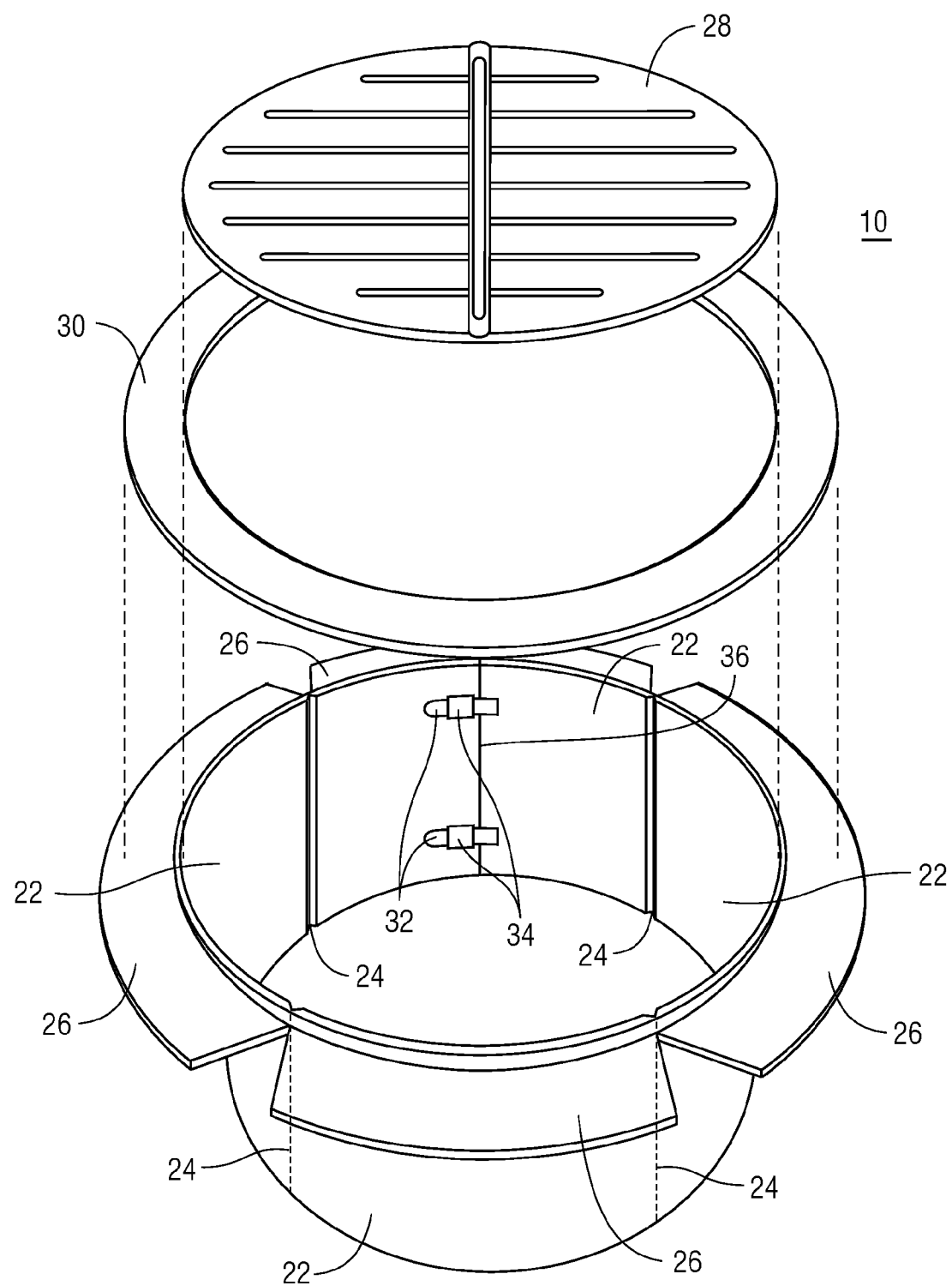
FIG. 6 is an exploded view of the assembled HVAC duct collar with an installed damper and gasket.

A variety of devices may be centrally installed within the assembled HVAC duct collar 10. As shown in FIG. 6, for example, a damper 28 having a corresponding circular cross-section to the HVAC duct collar 10 is installed. The damper 28 functions to regulate the airflow passing out of the HVAC duct collar 10, from the connected HVAC ductwork. The damper 28 also adds structure to the assembled HVAC duct collar 10 that assists in maintaining the tube shape of the HVAC duct collar 10. Other devices could be installed within the assembled HVAC duct collar 10, such as, but not limited to, vents, louvers, fans, etc. Each of these other devices, in addition to performing their respective function, will further assist the HVAC duct collar 10 in maintaining the tube shape around the central axis. A gasket 30 may also be placed on the flanges 26, which is a mechanical seal that fills the space between the flanges 26 and the a wall, ceiling, or other surface (not shown), to prevent leakage from or into the HVAC duct collar 10 when properly installed on the wall, ceiling, or other surface.

Figure 7:
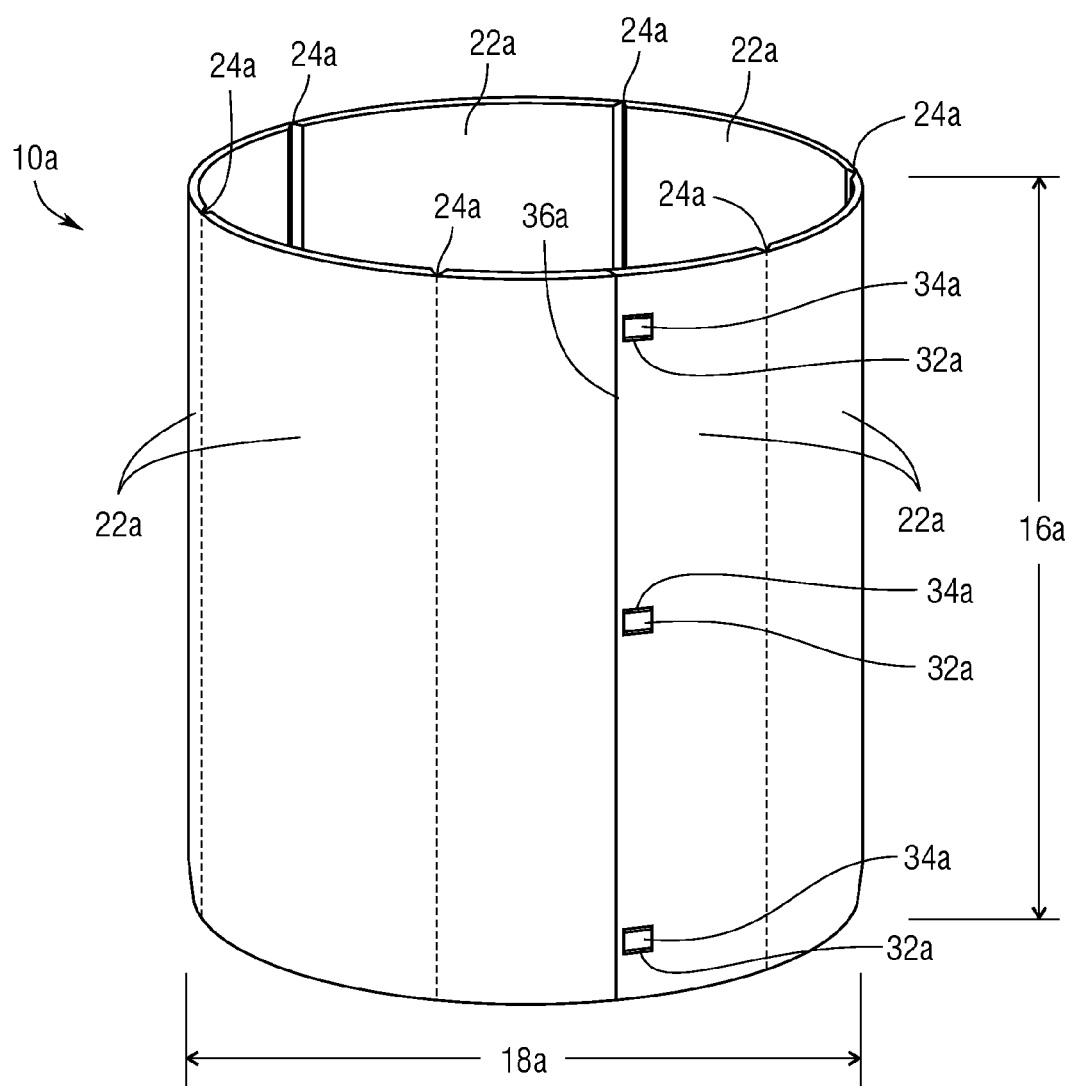
FIG. 7 is a perspective view of another embodiment of an assembled HVAC conduit.
Figure 8:
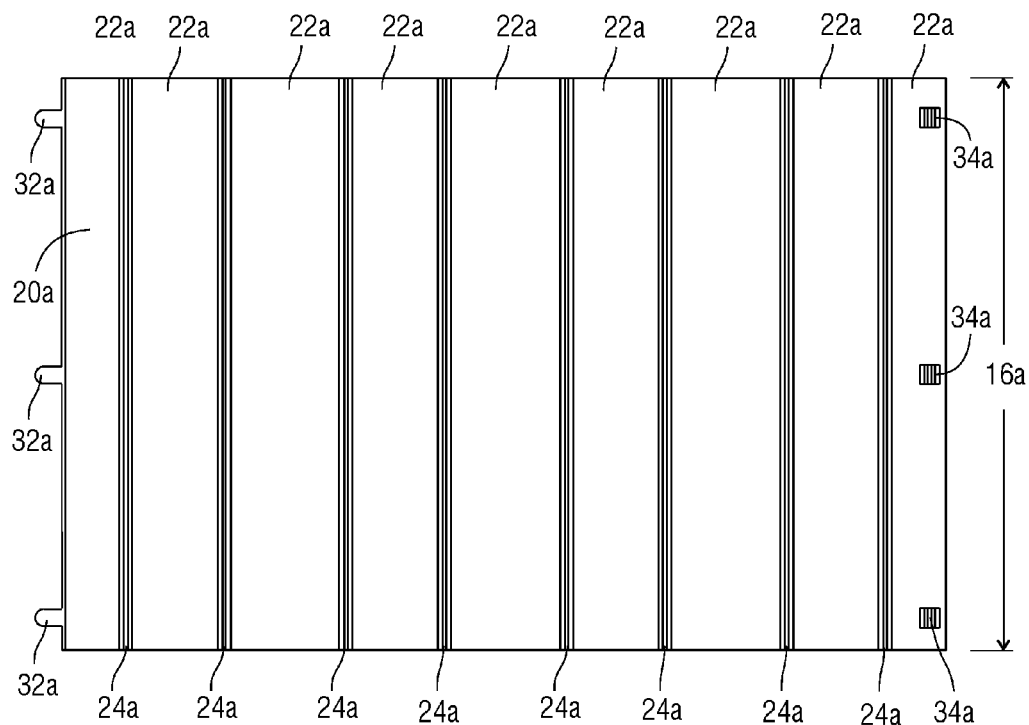
FIG. 8 is a top view of the unfolded HVAC conduit of FIG. 7.

As shown in FIGS. 7 and 8, another embodiment an assembled foldable HVAC ductwork is an HVAC conduit 10a to a duct that is a tube around the central axis 14a and has a circular cross-section 12a. In this embodiment, the assembled HVAC conduit 10a has a length 16a that is considerably longer than its width 18a. In fact, the only difference between this embodiment of the assembled HVAC conduit 10a and the previous embodiment, as discussed above, is the length 16a of the assembled HVAC conduit 10a and the absence of a flange. The HVAC conduit can be made into a variety of lengths and can be formed into a variety of diameters of assembled tubing.

Figure 9A:
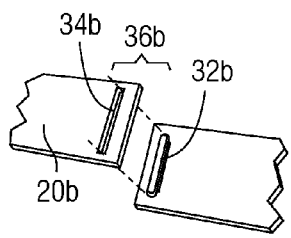
FIG. 9A is an embodiment of the locking mechanisms of the HVAC ductwork.

As shown in FIG. 9A, a locking mechanism set, having both a first locking mechanism 32b and a second locking mechanism 34b, is found at both ends of the length of the strip of material 20b. Both the first locking mechanism 32b and second locking mechanism 34b are adapted to interlock with each other to create an interlocking site 36b, which is the equivalent of a seam between the interlocked ends of the length of the strip of material 20b. In this embodiment the first locking mechanism 32b is a tab and the second locking mechanism 34b is an adapted hole to which the first locking mechanism 32b mates. Typically, the strip of material 20b incorporates two sets of locking mechanisms 32b and 34b to properly assemble and secure the HVAC duct collar into its tube shape, but it should be understood that the strip of material 20b can incorporate more than two sets. One having ordinary skill in the art will also see that a finishing seal (not shown) may also be applied to the interlocking site 36b. This finishing seal ensures that the interlocking site 32b is air tight, which may be needed in certain instances after installation. The finishing seal could be an adhesive material fixedly applied over and covering the interlocking site 36b, but the finishing seal is not limited solely to this embodiment.

Figure 9B:
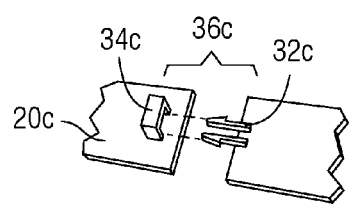
FIG. 9B is another embodiment of the locking mechanisms of the HVAC ductwork.

As shown in FIG. 9B, a locking mechanism set, having both a first locking mechanism 32c and a second locking mechanism 34c, is found at both ends of the length of the strip of material 20c. Both the first locking mechanism 32c and second locking mechanism 34c are adapted to interlock with each other to create an interlocking site 36c, which is the equivalent of a seam between the interlocked ends of the length of the strip of material 20c. In this embodiment the first locking mechanism 32c and second locking mechanism 34c together complete a buckle. The first locking mechanism 32c is the male part that mates with and locks into the second locking mechanism 34c, which is the female part. Typically, the strip of material 20c incorporates two sets of locking mechanisms 32c and 34c to properly assemble and secure the HVAC duct collar into its tube shape, but it should be understood that the strip of material 20c can incorporate more than two sets. One having ordinary skill in the art will also see that a finishing seal (not shown) may also be applied to the interlocking site 36c. This finishing seal ensures that the interlocking site 32c is air tight, which may be needed in certain instances after installation. The finishing seal could be an adhesive material fixedly applied over and covering the interlocking site 36c, but the finishing seal is not limited solely to this embodiment.

Figure 9C:
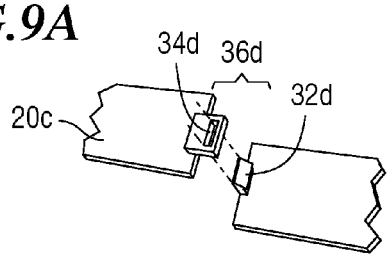
FIG. 9C is another embodiment of the locking mechanisms of the HVAC ductwork.

As shown in FIG. 9C, a locking mechanism set, having both a first locking mechanism 32d and a second locking mechanism 34d, is found at both ends of the length of the strip of material 20d. Both the first locking mechanism 32d and second locking mechanism 34d are adapted to interlock with each other to create an interlocking site 36d, which is the equivalent of a seam between the interlocked ends of the length of the strip of material 20d. In this embodiment the first locking mechanism 32d is a hook and second locking mechanism 34d is the loop in which the first locking mechanism 32d hooks into. Typically, the strip of material 20d incorporates two sets of locking mechanisms 32d and 34d to properly assemble and secure the HVAC duct collar into its tube shape, but it should be understood that the strip of material 20d can incorporate more than two sets. One having ordinary skill in the art will also see that a finishing seal (not shown) may also be applied to the interlocking site 36d. This finishing seal ensures that the interlocking site 32d is air tight, which may be needed in certain instances after installation. The finishing seal could be an adhesive material fixedly applied over and covering the interlocking site 36d, but the finishing seal is not limited solely to this embodiment.

Figure 9D:
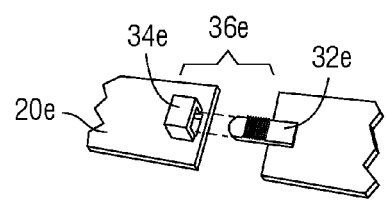
FIG. 9D is another embodiment of the locking mechanisms of the HVAC ductwork.

As shown in FIG. 9D, a locking mechanism set, having both a first locking mechanism 32e and a second locking mechanism 34e, is found at both ends of the length of the strip of material 20e. Both the first locking mechanism 32e and second locking mechanism 34e are adapted to interlock with each other to create an interlocking site 36e, which is the equivalent of a seam between the interlocked ends of the length of the strip of material 20e. In this embodiment the first locking mechanism 32e and second locking mechanism 32e form a snap fit latch. The first locking mechanism 32e is the barbed male part of the latch that that mates with and locks into the second locking mechanism 34c, which is the female part. With this embodiment, once the first locking mechanism 32e has mated with and locked into the second locking mechanism 34e, the two mechanisms are permanently interlocked and their interlocking cannot be undone. Typically, the strip of material 20e incorporates two sets of locking mechanisms 32e and 34e to properly assemble and secure the HVAC duct collar into its tube shape, but it should be understood that the strip of material 20e can incorporate more than two sets. One having ordinary skill in the art will also see that a finishing seal (not shown) may also be applied to the interlocking site 36e. This finishing seal ensures that the interlocking site 32e is air tight, which may be needed in certain instances after installation. The finishing seal could be an adhesive material fixedly applied over and covering the interlocking site 36e, but the finishing seal is not limited solely to this embodiment.

It should be understood that any form of locking mechanism that functions to secure the assembled HVAC ductwork into its tube shape may be implemented into the HVAC ductwork. Other embodiments of locking mechanisms (not shown) may include, but are not limited to, zippers, teeth, pins, adhesives, welding, or any combination thereof.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. Foldable HVAC ductwork comprising:
   a strip of material divided into a plurality of circumferential segments by a plurality of living hinges such that said living hinges allow said HVAC ductwork to unfold for transportation and storage;
   said strip of material having a first locking mechanism and a second locking mechanism;
   said first locking mechanism and said second locking mechanism adapted to interlock at an interlocking site, creating the assembled HVAC ductwork;
   a flange extending laterally from an edge of one of said plurality of circumferential segments such that when the HVAC ductwork is assembled it forms into an HVAC duct collar; and
   a damper installed within said assembled HVAC duct collar.

2. The foldable HVAC ductwork of claim 1 wherein said assembled HVAC conduit having a circular cross-section.

3. The foldable HVAC ductwork of claim 1 wherein said strip of material is made from a molded polymer.

4. The foldable HVAC ductwork of claim 1 further comprising a flange extending from one of said plurality of circumferential segments such that when the HVAC ductwork is assembled it forms into an HVAC duct collar.

5. The foldable HVAC ductwork of claim 1 further comprising a gasket installed on said flange to create a mechanical seal when said assembled HVAC duct collar is installed.

6. The foldable HVAC ductwork of claim 1 further comprising a finishing seal applied to said interlocking site, facilitating an air tight seal in said assembled HVAC ductwork.

7. Foldable HVAC ductwork comprising:
   a strip of material divided into a plurality of circumferential segments by a plurality of living hinges such that said living hinges allow said HVAC ductwork to unfold for transportation and storage;
   a locking means for creating the assembled HVAC ductwork;
   a flange extending laterally from an edge of one of said plurality of circumferential segments such that when the HVAC ductwork is assembled it forms into an HVAC duct collar; and
   a damper installed within said assembled HVAC duct collar.

8. The foldable HVAC ductwork of claim 7 wherein said assembled HVAC ductwork having a circular cross-section.

9. The foldable HVAC ductwork of claim 7 wherein said strip of material is made from a molded polymer.

10. The foldable HVAC ductwork of claim 7 further comprising a flange extending laterally from one of said plurality of circumferential segments such that when the HVAC ductwork is assembled it forms into an HVAC duct collar.

11. The foldable HVAC ductwork of claim 7 further comprising a gasket installed on said flange to create a mechanical seal when said assembled HVAC duct collar is installed.

12. The foldable HVAC ductwork of claim 7 further comprising a finishing seal applied to said locking means, facilitating an air tight seal in said assembled HVAC ductwork.

13. A HVAC duct collar for connecting to an HVAC conduit comprising:
- a strip of material divided into a plurality of circumferential segments by a plurality of living hinges such that said living hinges allow said HVAC duct collar to unfold for transportation and storage;
- a flange extending laterally from an edge of one of said plurality of circumferential segments;
- said strip of material made from a molded polymer and having a first locking mechanism and a second locking mechanism;
- said first locking mechanism and said second locking mechanism adapted to interlock at an interlocking site, creating an assembled HVAC duct collar having a circular cross-section; and
- a damper is installed within said assembled HVAC duct collar.

14. The HVAC duct collar of claim 13 further comprising a finishing seal applied to said interlocking site, facilitating an air tight seal in said assembled HVAC duct collar.

15. The HVAC duct collar of claim 13 further comprising a gasket installed on said flange to create a mechanical seal when said assembled HVAC duct collar is installed.

* * * * *